Nov. 8, 1955 V. STANZIALE 2,723,156
SELF POSITIONING AUTO COVER
Filed Feb. 26, 1953 2 Sheets-Sheet 2
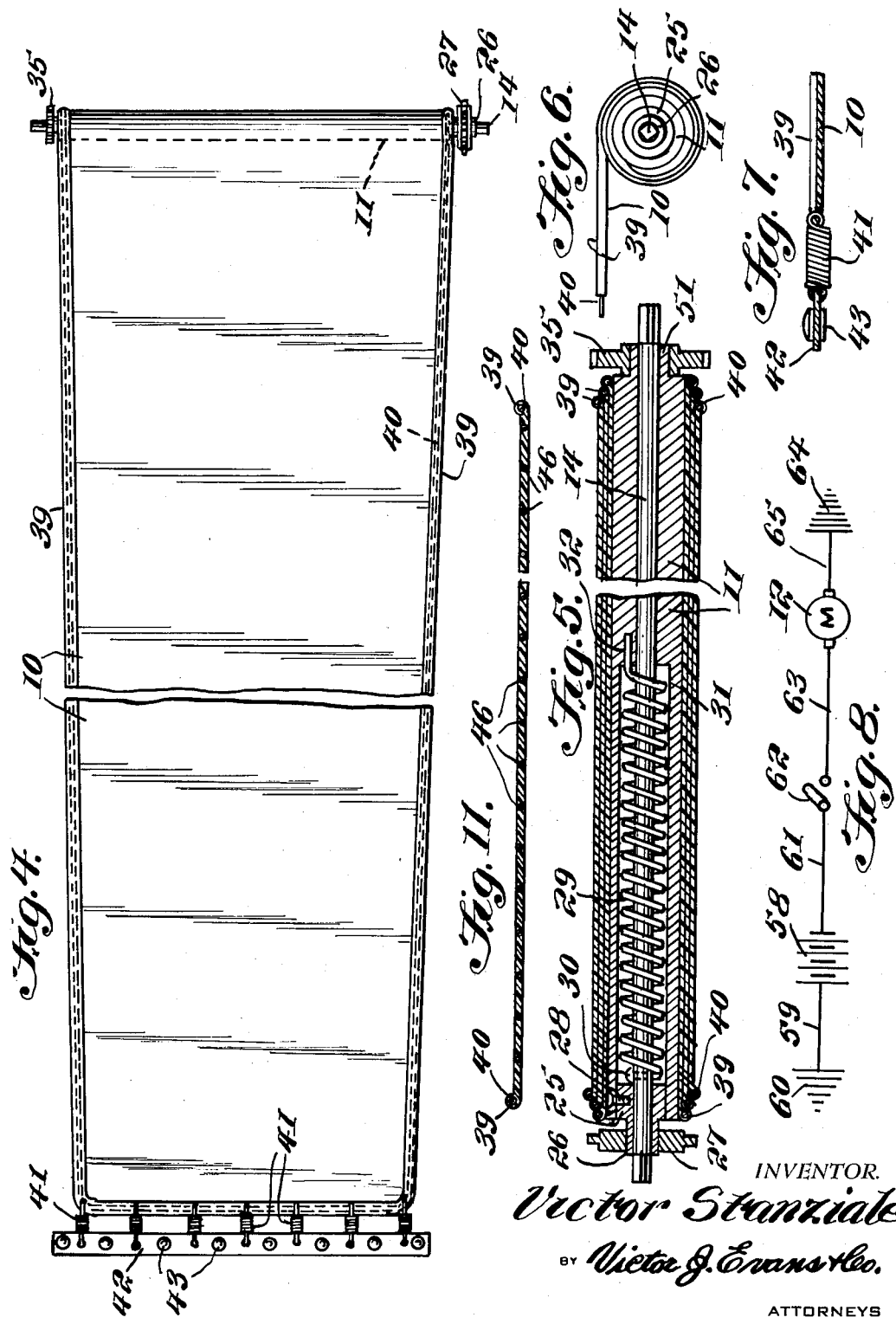
INVENTOR.
Victor Stanziale,
BY Victor J. Evans & Co.
ATTORNEYS

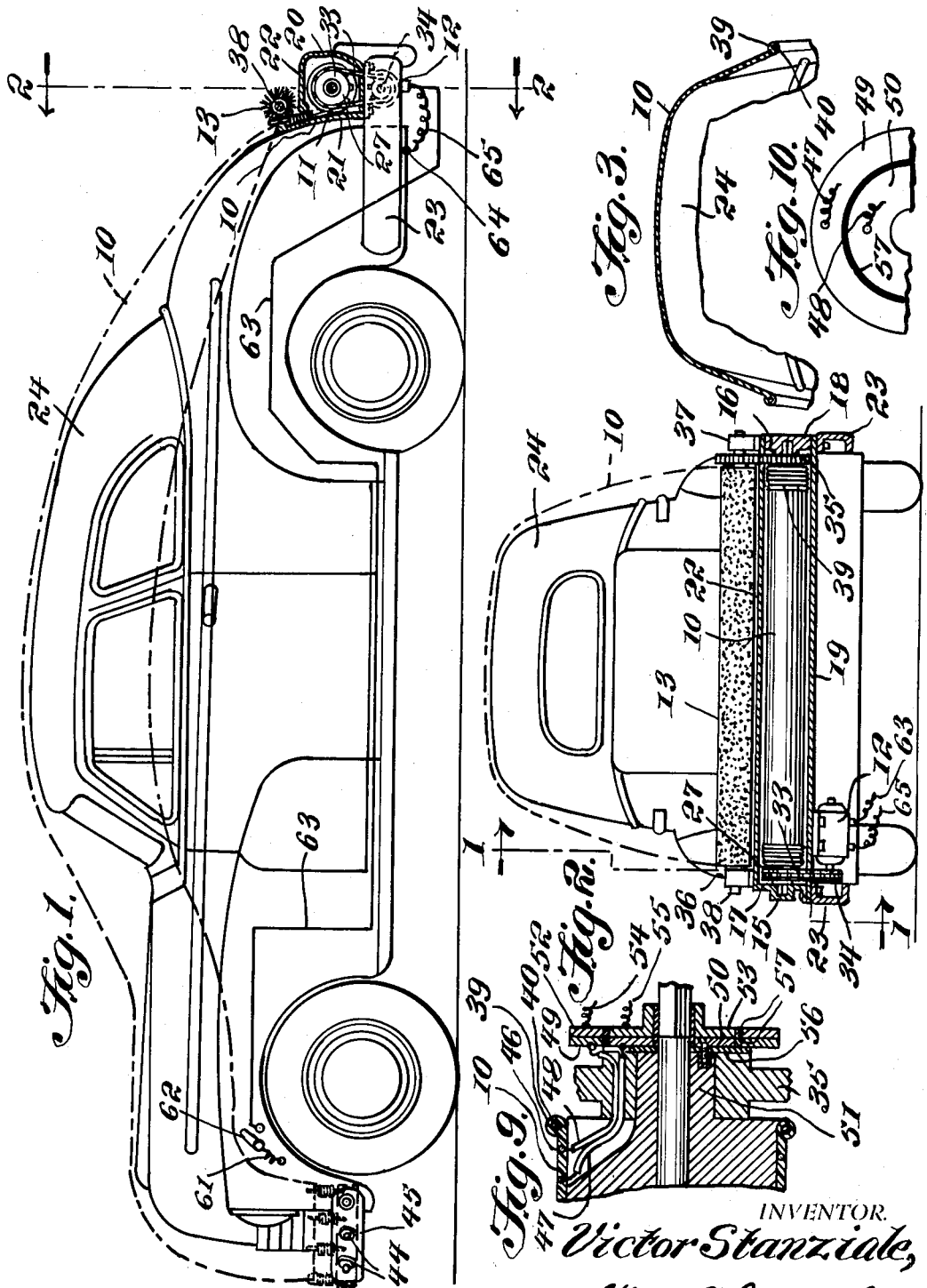

United States Patent Office 2,723,156
Patented Nov. 8, 1955

2,723,156
SELF POSITIONING AUTO COVER

Victor Stanziale, Astoria, N. Y.

Application February 26, 1953, Serial No. 338,976

1 Claim. (Cl. 296—98)

This invention relates to flexible waterproofing covers for motor vehicles, and in particular a sheet of material, such as plastic rolled upon a roller in a casing on the rear bumper of a motor vehicle in which the cover has sufficient resiliency inherent therein whereby upon unrolling the roller with a motor the cover crawls upwardly over the body of the vehicle to the forward end where fasteners thereon may be attached to the front bumper or other part of the vehicle.

The purpose of this invention is to provide a temporary cover for a motor vehicle in which the cover may be installed at the rear of the vehicle body and may be actuated by pressing a button whereby the cover travels freely from one end of the vehicle to the other without tracks or other permanent guide elements.

Various types of covers have been provided for motor vehicles, however, with the conventional type of cover it is difficult for an operator, particularly in inclement weather to install the cover without soiling his hands or garments. With covers of this type it is also difficult to fold or roll the cover when it is desired to use the vehicle. With this thought in mind this invention contemplates a cover that operates like a roll of film wherein upon rotation of a roller upon which the cover is rolled in one direction the flexible cover travels, without guide elements over the upper surface of a vehicle body to completely cover the vehicle and which, upon reversing the motor or driving element returns to the position on a roller or in a casing.

The object of this invention is, therefore, to provide means for mounting a flexible cover on a motor vehicle whereby the cover may readily be applied to the vehicle and readily removed therefrom.

Another object of the invention is to provide means for mounting and operating a rainproof cover for motor vehicles that is adapted to be mounted on vehicles now in use without changing parts thereof.

A further object of the invention is to provide an improved button actuated motor vehicle cover which is of a simple and economical construction.

With these and other objects and advantages in view the invention embodies an elongated flexible sheet in the form of a blanket having heating elements extended therethrough, a roller upon which said sheet of material may be wrapped, a casing for mounting the roller at the rear of a motor vehicle body, means for rotating the roller and means for temporarily fastening the extended end of the sheet of material to the forward end of the vehicle.

Other features and advantages of the invention will appear from the following description taken in connection with the drawings, wherein:

Figure 1 is a side elevational view of a motor vehicle taken on line 1—1 of Fig. 2 showing a cover for the vehicle with the cover positioned on a roller in a casing mounted on a bumper at the rear of the vehicle, the casing being shown in section and the cover being illustrated in the extended position in broken lines.

Figure 2 is a section taken on line 2—2 of Fig. 1 showing a rear elevational view of the vehicle and showing a longitudinal section through the casing in which the vehicle cover is mounted.

Figure 3 is a detail showing the upper portion of the vehicle body with the cover, which is shown in section, positioned on the body.

Figure 4 is a plan view of the cover, the edges of the cover being tapered to permit wires in the edges of the cover rolling without bulging.

Figure 5 is a longitudinal section through the roller with the parts shown on an enlarged scale and showing part of the cover rolled thereon.

Figure 6 is a detail showing one end of the roller with part of the cover extended therefrom.

Figure 7 is a longitudinal section through the extended end of the cover illustrating snaps and springs carried by the end of the cover for attaching the extended end of the cover to the bumper or forward part of the vehicle.

Figure 8 is a wiring diagram illustrating a circuit to a motor for operating the roller.

Figure 9 is a detail with the parts shown on an enlarged scale showing a section at one end of the roller and illustrating a modification wherein current is supplied to electric heating elements in the cover.

Figure 10 is a detail showing an elevational view of insulated rings at the end of the roller of the design shown in Figure 9.

Figure 11 is a detail showing a cross section through the cover of the design shown in Figure 9, illustrating the position of the electric heating elements therein.

Referring now to the drawings wherein like reference characters denote corresponding parts the improved motor vehicle cover of this invention includes a sheet 10 of flexible material, such as plastic, a spring actuated roller 11 upon which the sheet 10 is wrapped, a motor 12 for rotating the roller 11, and a brush 13.

The roller 11 is mounted on a shaft 14, the ends of which are held in sockets 15 and 16 of end walls 17 and 18 of a casing having a base 19, an outer wall 20, an inner wall 21 and an upper panel or cover 22.

The casing is adapted to be mounted on the rear bumper 23 of a motor vehicle as indicated by the numeral 24.

The roller 11 is journaled on the shaft 14 and, as illustrated in Fig. 5, one end of the roller is secured to a bushing 25 also journaled on the shaft and the bushing is provided with a sleeve 26 on which a sprocket 27 is mounted. The roller is secured to the bushing with screws 28 and a spring 29, positioned in the roller 11 is secured at the point 30 to the shaft 14 with the opposite end 31 extended into an opening 32 in the roller. With the parts formed in this manner rotation of the roller to extend the cover to the position indicated by the broken lines in Fig. 1 winds the spring 29 and when the extended end of the cover is released the roller operates as a shade roller rewinding the cover thereon.

The roller is rotated by the motor 12 with a chain 33 which is trained over the sprocket 27 and also over a sprocket 34 on the motor shaft.

A gear 35 is provided at the opposite end of the roller for rotating the brush 13 which is mounted on a shaft 38, journaled in bearings 36 and 37 on the upper part of the casing. The gear 35 is positioned to mesh with a gear on the shaft 38 of the brush. With the brush mounted in this manner the brush is rotated in a clockwise direction as the cover is drawn into the casing whereby dust, dirt, and the like is removed from the surface of the cover.

The material of the cover is rolled or hemmed at the edges providing a bead 39 and a continuous wire or other flexible reinforcing element, as indicated by the numeral 40 is extended through the hem or bead.

The extended end of the cover is provided with springs 41 which connect the cover to a bar 42 and snap elements 43 on the bar are positioned to be engaged with corresponding elements 44 on a front bumper 45. By this means a resilient connection is provided for holding the extended ends of the cover to the bumper at the front of the vehicle.

As illustrated in Fig. 11 the sheet of material or cover 10 is provided with a network of electric heating element wires, as indicated by the numeral 46 and these wires are connected by wires 47 and 48, as shown in Fig. 9 to contact rings 49 and 50, at the end of a bushing 51, on which the gear 35 is mounted, and the rings 49 and 50 are positioned to contact corresponding rings 52 and 53, respectively from which wires 54 and 55 extend. The rings are insulated from the bushing 51 with an insulating washer 56 and the inner rings are insulated from the outer rings with insulating bands 57.

As illustrated in Fig. 8 the motor 12 is connected in a circuit from a battery 58, such as the battery of the vehicle, and one side of the battery is connected with a wire 59 to a ground 60 whereas the opposite terminal of the battery is connected by a wire 61 to a switch 62. The opposite terminal of the switch 62 is connected with a wire 63 to one terminal of the motor 12 and the opposite terminal of the motor is connected to a ground 64 by a wire 65.

With the parts arranged in this manner the casing, with the roller and cover therein is mounted on the rear portion of a motor vehicle with the extended end of the cover extending through a slot at one side of the casing, and when it is desired to position the cover over a motor vehicle the switch to the motor circuit is closed whereby the roller is rotated in a clockwise direction and the extended end of the cover crawls upwardly over the body of the vehicle. When the extended end of the cover reaches the front bumper or forward end of the vehicle the snap fastener elements are connected and the cover remains in place.

When it is desired to remove the cover the snap fasteners are disconnected and the cover may be returned by the spring, or the roller may be rotated in the opposite direction by reversing the motor or by other suitable means.

It will be understood that other modifications, within the scope of the appended claim, may be made in the design and arrangement of the parts without departing from the spirit of the invention.

What is claimed is:

A cover, for a motor vehicle having front and rear bumpers, comprising a sheet of flexible resilient material, a casing adapted to be mounted on the rear bumper of the vehicle and including spaced parallel vertically disposed end walls provided with sockets, said casing further including a base, an outer wall and an inner wall, a shaft having its ends seated in said sockets, a roller mounted on said shaft, said cover attached at one end to said roller, a bushing journaled on said shaft and secured to an end of said roller, a sleeve extending outwardly from said bushing, a sprocket mounted on said sleeve, a spring positioned in said roller, said spring being secured at one end to said roller and at its other end to said shaft, said spring adapted to retract the cover, means for unrolling the cover and extending the cover over the top of the vehicle, a second sprocket driven by said means, an endless chain trained over said sprockets, the edges of said sheet providing a bead, a continuous flexible reinforcing element extending through said bead, a plurality of springs projecting from the extended end of said sheet, a bar connected to said last named springs, and snap elements on said bar for engagement with the front bumper of the vehicle.

References Cited in the file of this patent

UNITED STATES PATENTS

| | | |
|---|---|---|
| 951,089 | Cooper | Mar. 1, 1910 |
| 1,169,927 | Collier | Feb. 1, 1916 |
| 1,255,809 | Stenson | Feb. 5, 1918 |
| 1,280,272 | Montroy | Oct. 1, 1918 |
| 2,213,601 | White | Sept. 3, 1940 |
| 2,230,908 | Reiman | Feb. 4, 1941 |
| 2,594,910 | Germann | Apr. 29, 1952 |
| 2,688,513 | Poirier | Sept. 7, 1954 |

FOREIGN PATENTS

| | | |
|---|---|---|
| 473,572 | Great Britain | Oct. 15, 1937 |
| 754,351 | France | Nov. 6, 1933 |